United States Patent [19]
Olivera et al.

[11] Patent Number: 5,437,477
[45] Date of Patent: Aug. 1, 1995

[54] LABEL FOR COMPUTER DISK

[75] Inventors: Alison J. Olivera; Hector J. Olivera, both of Douglasville, Ga.; Craig A. Knudsen, Palm Desert, Calif.

[73] Assignee: Turbo Upgrade Software, Douglasville, Ga.

[21] Appl. No.: 823,242

[22] Filed: Jan. 17, 1992

[51] Int. Cl.⁶ .................................................. B42D 15/00
[52] U.S. Cl. .................................... 283/81; 281/2; 281/5; 283/904
[58] Field of Search .................... 283/81, 74, 61, 62; 281/2, 5

[56] References Cited

U.S. PATENT DOCUMENTS

| | | | |
|---|---|---|---|
| 4,507,883 | 4/1985 | Tarrant | 40/2 R |
| 4,545,838 | 10/1985 | Minkus et al. | 283/904 X |
| 4,684,795 | 8/1987 | Colgate, Jr. | 283/904 X |
| 4,708,285 | 11/1987 | Segall | 229/68 R |
| 4,784,408 | 11/1988 | Yasuda | 283/81 |

FOREIGN PATENT DOCUMENTS

| | | | |
|---|---|---|---|
| 3836795 | 5/1990 | Germany | 281/2 |
| 1360288 | 7/1974 | United Kingdom | 281/5 |

OTHER PUBLICATIONS

Tandy ® Floppy Disk with attached 3-M label flag—circa 1990.

Primary Examiner—Paul A. Bell
Attorney, Agent, or Firm—Jones & Askew

[57] ABSTRACT

A label for a storage disk for a data processing system. The label is attached to the disk so that user may read the contents listed on the disk without having to eject the disk from the disk drive. The label is of a rigid construction to allow easily handling of the disk. The extension of the label past the end of the disk allows a place for anti-theft devices or restraining devices to be attached to the disk.

6 Claims, 1 Drawing Sheet

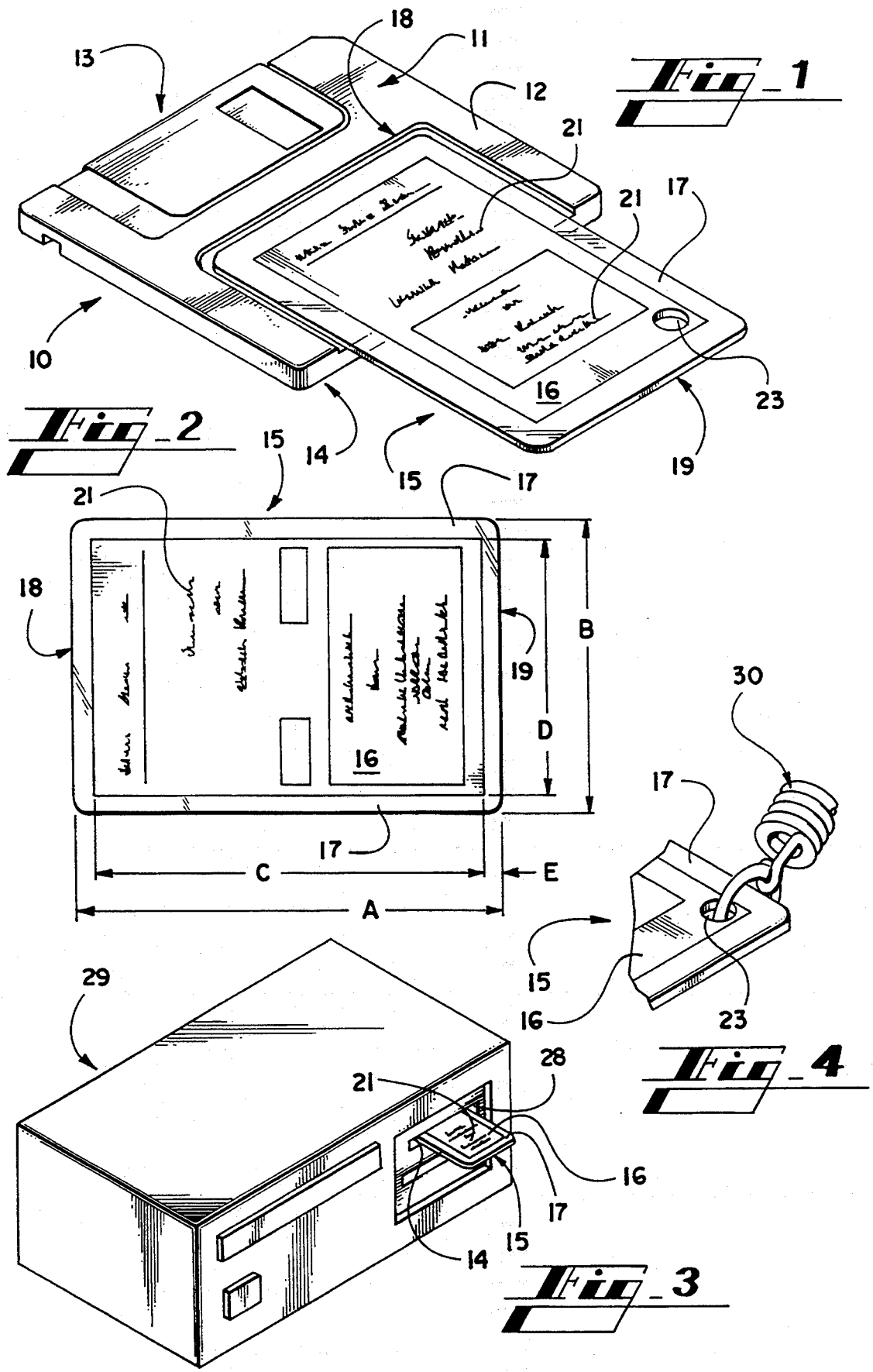

LABEL FOR COMPUTER DISK

TECHNICAL FIELD

The present invention relates to an attachment to a floppy disk for a computer, and more particularly relates to a label that is attached to the floppy disk and extends out of a disk drive when the disk is inserted therein.

BACKGROUND OF THE INVENTION

At present, data processing systems or computers are used in nearly every phase of organizations. A large part of the data and programming materials for such computers are stored on separate diskettes, generally referred to as "floppy" disks. One popular configuration for the floppy disk is the 3½ inch floppy disk which is encased in a hard, protective casing. The casing allows a number of such floppy disks to be stored in a stacked manner in boxes which are the width of the disks. The disks may be difficult to remove from the box because tight packaging does not allow fingers to enter on both sides of the disk to pull it out. Moreover, many users have problems inserting and ejecting the disk from disk drives, which results in the disk not being inserted all the way, or not popping out enough to grab the disk to remove.

Generally, the data stored on the floppy disk is identified by means of an adhesively attached paper label. Due to constant handling and grime on hands, labels on disks get dirty and unsightly over time. In fact, often information on labels is rendered illegible after repeated use.

Even if information on a disk may be read while the disk is in its storage box, it is impossible to read that information while the disk is inserted into a disk drive. Particularly, when the disk is completely inserted into the disk drive, at best only the very narrow end of the protective casing is visible to a user. Thus, in order to read the information on the protective casing, the disk must be ejected. Information could be written on a separate piece of paper, but this paper will invariably be lost or misplaced.

Approaches that have been used in the prior art are inadequate for solving these problems. Examples of these patents include: U.S. Pat. No. 4,507,883 to Tarrant, U.S. Pat. No. 4,708,285 to Segall, and U.S. Pat. No. 4,784,408 to Yasuda. The Yasuda patent discloses a disk label that is attached to the protective casing of the diskette, which is visible to the user upon inserting the disk in a drive. The label in Yasuda is attached to the disk by a pair of "attaching strips." These strips allow the label to hang freely from the diskette when the disk is inserted in the disk drive, making any writing on the label visible to a user while the diskette is inserted. When the diskette is ejected, the label folds around the protective cover and forms a storage sleeve. Although this label allows information to be available to the user when the diskette is in the disk drive, the label suffers from the other disadvantages discussed above. There is a need in the art for a label that provides easier handling as well as legibility over the life of the disk.

SUMMARY OF THE INVENTION

The present invention provides an improved label for a floppy. Generally described, the invention constitutes a disk labelling device comprising a storage disk for a data processing system, a protective casing for the storage disk, and a rigid label attached to the casing. The protective casing is configured for insertion in a disk drive of the data processing system. The rigid label is attached to the casing and extends from the casing in a plane that is parallel to the plane of the disk. Consequently, tile label protrudes from the disk drive when the floppy disk is in the disk drive.

The rigid label for the floppy disk comprises a plastic laminated card with data thereon. The plastic lamination substantially surrounds and overlaps the edges of the card. The rigid label is mounted on the protective casing of the floppy disk such that one end of the label overlaps the protective casing and the second end of the label is visible to a user when the disk is inserted in the disk drive. The label is preferably mounted in parallel relationship with the plane of the protective casing. The label may be blank so that writing may be added on the laminate by an alcohol pen. In addition, a card may be attached to the label so that information read by a user can be quickly changed.

The rigid label of the present invention may comprise a restraining cord to keep the disk in positional relationship with the data processing system or an anti-theft detection device to prevent theft of the disk. The label may be attached to the protective casing by a self-adhesive glue so that it may be replaceable and removeable by a user or the manufacturer.

Thus, it is an object of the present invention to provide a disk labelling device.

It is a further object of the present invention to provide a disk labeling device that facilitates handling and retrieving floppy disks.

Another object of the present invention is to provide a disk labeling device for displaying data written on a label for a floppy disk that is visible when the floppy disk is inserted in a disk drive.

Yet another object of the present invention is to provide a disk labeling device for a floppy disk which will not smudge or smear upon handling by a user.

Another object of the present invention is to provide a disk labeling device which constitutes an antitheft device.

Other objects, features and advantages of the present invention will become apparent upon reading the following detailed description of embodiments of the invention, when taken in conjunction with the accompanying drawing and the appended claims.

BRIEF DESCRIPTION OF THE DRAWING

FIG. 1 is a pictorial view of a disk labelling device of the present invention.

FIG. 2 is an upper pictorial view of the label of FIG. 1.

FIG. 3 is a perspective view of a data processing unit with the disk labelling device of FIG. 1 inserted in a disk drive.

FIG. 4 is an alternative embodiment of the disk labelling device of FIG. 1, including a retaining cord.

DETAILED DESCRIPTION OF THE DRAWINGS

Referring now to the drawing, in which like numerals refer to like parts throughout the several views, FIG. 1 shows a disk labelling device 10 in accordance with the present invention. The device 10 comprises a disk 11 in its protective casing 12, defining a front or disk drive engaging end 13 and a distal end 14 thereon. Attached to the protective casing 12 is the unique label 15 of the present invention. The label 15 comprises a card 16, preferably made of cardboard or paper. The card 16 is laminated with a laminating plastic 17 and has a front end 18 and a distal or extended end 19.

Referring now to FIG. 2, dimensions of the preferred embodiment of the label 15 are as follows. The entire label 15 is $3\frac{3}{4}$ inches in length (dimension A) by $2\frac{1}{2}$ inches in width (dimension B). The card 16 may be created with any type of paper or cardboard and is cut to dimensions of $3\frac{1}{2}$ inches in length (dimension C) by $2\frac{1}{4}$ inches in width (dimension D). Writing 21 on the card 16 may be created with any computer word processing or graphics package, printed out on a standard piece of paper and then cut with a paper cutter to correct dimensions.

The label 15 is inserted between two lamination sheets, being certain to center the card 16 in the middle of the pieces of plastic. A $\frac{1}{8}$-inch border (dimension E) of lamination plastic 17 will remain around the edge of the card 16, allowing the two pieces of lamination plastic 17 to fuse together when passed through a heat generating lamination machine (not shown). The paper card 16 is thus sealed inside the lamination 17.

The assembled label 15 is adhered to the protective casing 12 by a conventional adhesive process. Preferably, the label 15 is adhered to the protective casing 12 by a self-adhesive glue (not shown) that allows the label 15 to be installed by either a manufacturer or a user. This allows flexibility on the part of the user, to remove the label 15 if desired.

An alternate embodiment of the label 15 is constructed with a blank card 16. This type of label 15 may be adhered to an already purchased floppy. An alcohol pen (not shown) of the type known in the art may be used to write information on the label 15. Another embodiment uses a non-laminated blank card (not shown) that is adhered to the top of the label 15. Thus, the card is what will be seen by a user instead of the label 15. The label 15 in this construction may be blank or may have writing, or may just consist of the two laminate plastic pieces 17. Writing may then be added to this card directly by any conventional means.

Referring again to FIG. 1, the label 15 is attached or mounted to the protective casing 12 such that only part of the label 15 extends over and overlaps the protective casing 12. This part of the label 15, corresponding to the forward end 18 of the label 15, begins at a point preferably near the center of the protective casing 12 and extends rearwardly toward the distal end 14 of the protective casing 12. Thus, the plane of the label 15 is parallel to the plane of the protective casing 12. The label 15 continues to extend past the end 14 of the protective casing 12, so that an extension is formed by the distal end 19 of the label 15. This extension may be either more or less than the amount of the label attached to the protective casing 12, according to preference. If the self-adhesive glue is used, the length of the extension may be varied by a user.

As can be best seen by FIG. 3, when a diskette 11 with the label 15 of the preferred embodiment is inserted into a disk drive 28 of a data processing unit or computer 29, the extension of the label 15 extends out of the disk drive 28. This allows the information or data 21 on the label 15 to be read while the disk 11 is currently in the disk drive 28. In addition, because of the rigid construction of the label 15, it may be used as a "handle" to easily insert or remove the disk to avoid operator errors. Leaving the label 15 on the protective casing 12 while the diskette 11 is in a storage box (not shown) allows easy sorting and removal of the diskettes 11 from the box. Since the label 15 is laminated, it remains clean and shiny over its lifetime, which increases legibility of the information 21 on the card 16.

An embodiment of the present invention may include a mounting hole at location 23, shown in FIG. 1, for adding various elements to the label 15. For example, a physical restraining cord 30 may be attached to the location 23, as is shown in FIG. 4. The other end of the cord 30 is then attached in close proximity to the work station. Attachment of the cord 30 prevents the disk from physically leaving that work station.

In an alternative embodiment, an anti-theft detection device of conventional type (not shown) is attached to the label 15 at the location 23. The anti-theft device causes an alarm to sound once the device leaves a designated area and would be ideal for high traffic situations or in situations where demonstration copies must be left out where customers must actually use the disks.

The advantages of the present invention are apparent from the foregoing. The label 15 allows a user to read the contents listed on a disk without having to eject a disk from a disk drive. The rigid construction of the label allows easily handling, and the lamination prevents printed material from getting dirty or smudged. In addition, the label 15 provides a position 23 to attach anti-theft devices.

While this invention has been described in detail with particular reference to preferred embodiments thereof, it will be understood that variations and modifications can be effected within the spirit and scope of the invention as described herein before and as defined in the appended claims.

What is claimed is:

1. A combination comprising:
   a storage disk adapted to be placed in a known disk drive in a data processing system;
   said storage disk comprising a protective casing defining a plane;
   a labeling system comprising a card, a lamination substantially surrounding and overlapping the edges of said card with said card and said lamination forming a rigid label; and
   means for permanently adhering said label on said protective casing such that one end of said label overlaps said protective casing and whereby a second end of said label extends outwardly and is visible to a user when said disk is inserted in said disk drive and whereby the second end serves as a handle such that a user holding the label may grasp the label to place the disk in the disk drive.

2. The combination of claim 1, wherein said label further comprises data on said second end of said label whereby said data is visible to a user.

3. The combination of claim 1, further comprising:
   a data processing system containing said known disk drive; and
   a restraining cord defining two ends thereon, said first end of said cord being attached to the extended pan of said label and said second end of said cord being attached to said data processing system so as to keep said disk in positional relationship with said data processing system.

4. The combination of claim 1, further comprising a theft detection device mounted on the extended portion of said label.

5. The combination of claim 1, wherein said label is blank whereby writing may be introduced on said label by an alcohol pen.

6. A combination comprising:

a storage disk adapted to be placed in a known disk drive in a data processing system;

said storage disk comprising a protective casing defining a plane;

a labeling system comprising a card, a lamination substantially surrounding and overlapping the edges of said card with said card and said lamination forming a rigid label;

means for attaching said label on said protective casing such that one end of said label overlaps said protective casing and whereby a second end of said label extends outwardly and is visible to a user when said disk is inserted in said disk drive;

a data processing system containing said known disk drive; and a restraining cord defining two ends thereon, said first end of said cord being attached to the extended part of said label and said second end of said cord being attached to said data processing system so as to keep said disk in positional relationship with said data processing system.

* * * * *